United States Patent [19]

Rambacher

[11] 4,155,796

[45] May 22, 1979

[54] SINGLE SECTION TIRE BUILDING DRUM

[75] Inventor: John S. Rambacher, Akron, Ohio

[73] Assignee: The Goodyear Tire & Rubber Company, Akron, Ohio

[21] Appl. No.: 920,039

[22] Filed: Jun. 28, 1978

[51] Int. Cl.² ............................................. B29H 17/14
[52] U.S. Cl. .................................... 156/415; 156/401; 156/417
[58] Field of Search ............... 156/414, 415, 416, 417, 156/418, 419, 420, 401

[56] References Cited

U.S. PATENT DOCUMENTS

| | | | |
|---|---|---|---|
| 3,078,204 | 2/1963 | Appleby | 156/132 |
| 3,160,545 | 12/1964 | Burton | 156/415 |
| 3,160,546 | 12/1964 | Burton | 156/417 |
| 3,188,260 | 6/1965 | Nebout | 156/401 |
| 3,467,567 | 9/1969 | Woodhall | 156/415 |
| 3,816,218 | 6/1974 | Felten | 156/417 |
| 3,867,231 | 2/1975 | Casey | 156/420 |
| 4,045,277 | 8/1977 | Habert et al. | 156/400 |

FOREIGN PATENT DOCUMENTS 1177985  1/1970  United Kingdom ..................... 156/419

Primary Examiner—John E. Kittle
Attorney, Agent, or Firm—R. S. Washburn

[57] ABSTRACT

A single section radially and axially expandable tire building drum having solid cylindrical building surface support for stitching and the like for cylindrical form tire carcass building. Radial expansion is independent of axial adjustment of width. Radially expanded condition of the cylindrical building surface is positively supported. The drum is particularly suitable for building passenger car tires. The foregoing abstract is not to be taken as limiting the invention of this application, and in order to understand the full nature and extent of the tehcnical disclosure of this application, reference must be made to the accompanying drawing and the following detailed description.

7 Claims, 1 Drawing Figure

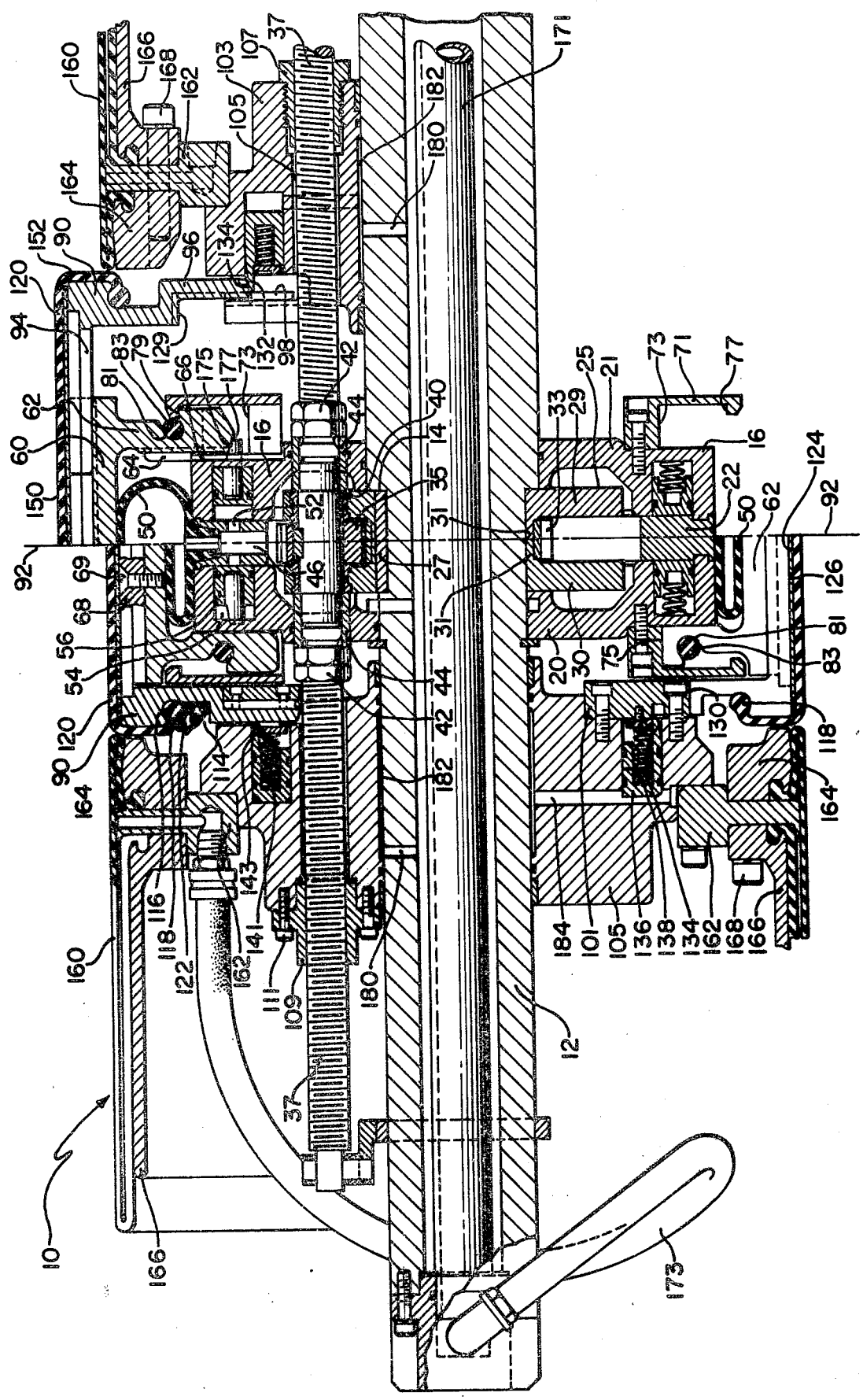

SINGLE SECTION TIRE BUILDING DRUM

BACKGROUND OF THE INVENTION

This invention relates to improvements in tire building drums, particularly to a tire building drum for building passenger car tires and the like.

Broadly, the invention comprises a tire building drum having a solidly supported axially and circumferentially continuous cylindrical building surface in each of two diametral conditions, the drum comprising means providing radial expansion including a single circumferential set of segments each having an axially spaced pair of radially inward extending legs and a T-section key extending from one to the other axial end thereof; means providing axial length adjustment of said building surface including a circumferential set of axially opposed pairs of segments abutting at the mid-circumferential plane of the first said set disposed in slidable interfitting relation with and slidable axially oppositely along said T-section key, each segment of said pairs having a radially inward extending portion, said portions being respectively axially outward of and adjacent the legs of said single set of segments, an axially opposed pair of hub members movable coaxially outward relatively of said single set of segments, each said hub member having radially extending guide means slidably retaining the respectively associated portions of said opposed pairs of segments.

To acquaint persons skilled in the arts most closely related to the present invention, certain preferred embodiments thereof illustrating a best mode now contemplated for putting the invention into practice are described herein by and with reference to the annexed drawings forming a part of the specification. The embodiments shown and described herein are illustrative and as will become apparent to those skilled in these arts can be modified in numerous ways within the spirit and scope of the invention defined in the claims hereof.

In the FIGURE there is shown a composite view in cross-section of a tire drum embodying the invention.

A tire building drum 10 according to the invention is described with reference to the drawing. The drum includes a center shaft 12 having a shoulder 14 which locates a center body 16 fixed axially of and corotatably on the shaft. The center body is provided by an opposed pair of annular plates 18,20 and an annular spacer 22, the spacer and the plates being formed to provide a hollow interior.

A ring gear housing 25 disposed between the plates and occupying the hollow interior of the body is fixed corotatably on the shaft by a key 27 sunk in the shaft. The ring gear housing has two oppositely disposed plate members 29,30 each of which provides a flange 31 abutting the like flange of the other member to provide a journal on which a ring gear 33 rotates. The ring gear is drivably meshed with a plurality of pinions 35 each of which is corotatably mounted on one of a plurality of right and lefthand screws 37. The ring gear and pinions provide for the rotation of the screws in timed relation with one another. The screws 37 are rotatable in bearings 40 fixed in the ring gear housing and are fixed axially of the drum by the lock nuts 42 and spacers 44 fixed on the screw. The spacers 44 are fitted rotatably in bores provided in the plates 18,20. O-rings seated in the body cooperate with the spacers to retain air pressure in the center body 16. The annular spacer 22 is drilled radially 46 to communicate pressured air to an annular inflatable tube 50 disposed circumferentially around and on the body 16 and provides means for expanding the drum 10 radially. The spacer 22 is also drilled at 52 to admit pressurized air into a pair of annular cylindrical cavities 54, one located in each of the plates of the body 16 to operate annular pistons 56 disposed respectively in the cavities.

Radial expansion means are provided by a circumferentially sequential set of segments 60 arranged about the body overlying the annular tube. Each segment has a pair of radially inwardly extending legs 62. Each leg is provided with a key 64 which slides in a radially oriented slot formed in the adjacent radially extending face 66 of the center body. The segments 60 are moved only radially of the drum 10 and are prevented by the center body 16 from being displaced axially of the drum.

A T-section key 68 extending axially the full length of each segment 60 is fixed to the segment by screws 69 or otherwise.

A pair of stop rings 71 are fixed coaxially on the respectively opposite axial faces 66 of the center body 16 and provide a surface 73 engageable with the stop 75 formed in the legs to limit the excursion of the segments 60 inwardly, to define a minimum diameter condition of the drum, and with a flange 77 which provides a stop engageable with a ledge 79 formed on each leg 62 to limit the radially outward excursion of the segments 60 at the maximum diameter condition of the drum 10. Each leg is provided with a groove 81 which grooves cooperate to provide a circumferential seat in which an elastic garter 83 is retained to bias the segments radially inwardly.

To provide axial length adjustment of the drum there are arranged circumferentially about the first set of segments 60 a plurality of pairs of axially opposed segments 90 which abut each other at the mid-circumferential plane 92 of the drum. Each of the axially paired segments is provided with a T-slot 94 conjugate with the T-section key 68 and is slidable axially therealong. The T-section key 68 cooperates to prevent relative radial movement between the paired segments 90 and the segments 60 of the first set.

Each of the axially paired segments 90 includes a radially inwardly extending portion 96 slidable on a guide key 98 which is fixed radially in the slots of an annular guide plate 101. Each guide plate 101 is bolted or otherwise secured to the axially inward surface of one of a pair of hub members 103,105 which are mounted slidably on the shaft 12 for movement axially toward and away from each other. Each of the hub members is provided with bores 105 extending parallel to and radially spaced outward from the shaft to accommodate the respective right and lefthand screws 37 therethrough. A nut 107 fixed in the hub member 103 is in thread engagement with the screw 37. A second nut 109 in thread engagement with the screw 37 is mounted in the hub member 105 but with provision for relative rotation of the nut with respect to the hub member in order accurately to position the respective hub members relative to the mid-circumferential plane before fixing the nut 109 against rotation as by the cap screws 111 shown.

Each of the axially paired segments 90 has in the axially outward face of the inward extending portion 96 a recess 114 undercut radially outwardly to provide a circumferential seat 116 in which the circumferential edge 118 of a radially and axially extensible elastomeric sleeve 120 is anchored by toggle clips 122 which secure the edge of the sleeve.

Arranged between the outer circumferential surface 124, provided by the axially paired segments 90 and the overlying sleeve 120, a plurality of bridging plates 126 extend the full axial length of each pair of the axially paired segments. Each bridging plate also extends arcuately to overlie a portion of the next adjacent pair of axially paired segments. The cover plates, however, are secured each to one of the circumferentially adjacent segments, each being freely slidable with respect to the other, axially opposed, segments during the relative axial movement thereof. Each of the radially inward portions 96 of the axially paired segments is offset to provide a shoulder 129 which engages the perimeter 130 of the guide plate 101 to determine the radially inward excursion of the paired segments 90. The radially inward extremity of the radially inward portions of the paired segments is provided with a bevelled face 132 which is engaged by a lip 134 formed on an annular piston 136 which is slidable axially in an annular chamber 138 by an influx of pressured air therein against the bias of a plurality of springs 141 disposed in spring sockets in the piston 136 which springs bear against a plate 143 fixed in the hub member.

To adjust the axial length of the building surface 150 of the drum the screws 37 are rotated manually thereby moving the respective hub members 103,105 away from the center body 16 as may be seen in the righthand portion of the figure. The axial movement of the hub members causes the axially paired segments 90 to move oppositely axially of the first set of segments 60. The arrangement allows the axial length of the drum between the bead-locating shoulders 152 to be adjusted in infinitesimal increments, throughout the range of adjustment, while preserving the support throughout the axial and circumferential extent of the cylindrical surface 150 of the drum.

To provide for support of turnup bladders 160, the outside diameters of which equal the outside diameter of the center sleeve 120 in its minimum diameter condition, a mounting ring 162 provided with air connection for pressured air to the turnup bladder, is affixed to each of the hub members and carries an inner support ring 164 and an outer extended cylindrical support 166 in an assembly with the ring 162 secured by the bolts 168. The turnup bladder assembly and its support are readily removed and replaced on the associated hub member as a unit assembly.

Pressured air for operating the turnup bladders 160 is communicated by a tube 171 occupying the bore of the shaft 12 and connected by a flexible hose 173 as seen in the figure. Pressured air to expand the drum radially, as well as to lock the drum 10 in its radially outward excursion in the maximum diameter condition of the drum, is communicated by the annular space in the shaft bore around the tube 171 to a port 173 in the wall of the shaft open into the interior of the hollow center body 16 and thence by way of the drilled passage 46 to the inflatable annular tube 50. Pressure then rises, when the center set of segments 60 reaches its extreme outward excursion, to actuate the pistons 56 thereby wedging the respective lips 175 outward axially into engagement with the radially inner tapered surface 177 of the legs 62. Such air pressure is also communicated by way of the ports 180 into an annular space 182 enclosed between the shaft 12 and the hub member to a passage 184 communicating with the annular chambers 138 so as to actuate the annular pistons 136 to engage the lips 134 thereof with the bevelled faces 132 of the respective axially paired segments 90. The cylindrical building surface 150 of the drum 10 is solidly supported for tire building operations in each of its two diametral conditions, enabling stitching and other operations to be performed very satisfactorily. Even when the axially paired segments 90 are moved to their axially outermost positions the drum surface is solidly supported because of the arrangement and axially spaced locations of the respective lips 134 and 175.

The tire building drum hereof provides the advantage of both axial length adjustment in infinitesimal increments and of radial expansion of a firm cylindrical surface from a collapsed condition of lesser diameter to an expanded condition of a greater diameter in which the cylindrical surface is positively fixed concentrically throughout its length and throughout its range of axial adjustment. The arrangement provides very precise building in the "flat" cylindrical or "first-stage" of the developed cross-sectional length of the ply between the beads of the tire.

The drum disclosed also provides the advantage of maintaining the turnup bladders and their supporting means in predetermined close juxtaposition with the bead-locating shoulders 152, which are formed when the drum is expanded. This juxtaposition is permanent because the relation of the turnup bladder and the drum shoulder is fixed regardless of the adjusted axial length of the expandable building surface.

Particularly notable, moreover, the drum can provide a lesser axial length between bead shoulders than previously known drums of the type disclosed by P. E. Appleby in U.S. Pat. No. 3,078,204. In the tire building drum of the present invention only a single radial expansion means located centrally of the axial length of the drum is required. The drum, therefore, is particularly adapted to the manufacture of small passenger tires.

While certain representative embodiments and details have been shown for the purpose of illustrating the invention, it will be apparent to those skilled in the art that various changes and modifications may be made therein without departing from the spirit or scope of the invention.

What is claimed is:

1. A tire building drum having a single axially and circumferentially extendable elastomeric center sleeve providing an outward cylindrical tire building surface, and a pair of cord-reinforced turnup bladders disposed respectively coaxially adjacent the associated axial ends of said surface, comprising expansion means operable to expand said surface radially including a plurality of radially movable central segments and a plurality of axially opposed pairs of segments abutting at the midcircumferential plane of said central segments, respectively overlying and slidable on and axially oppositely with respect to the associated central segments, the edges of said sleeve being secured respectively to the associated paired segments, an opposed pair of hub members carrying said turnup bladders thereon movable coaxially of each other and spaced axially apart sufficiently to accommodate said radial expansion means therebetween, and means fixed respectively on said hub members for securing said pairs of segments for radial sliding movement with said central segments and for axial movement with the respective hub members outwardly of said central segments to lengthen said cylindrical surface axially while said sleeve is supported by the pairs of overlying segments.

2. A tire building drum having a solidly supported axially and circumferentially continuous cylindrical building surface in each of two diametral conditions, the drum comprising means providing radial expansion including a single circumferential set of segments each having an axially spaced pair of radially inward extending legs and a T-section key extending from one to the other axial end thereof;

means providing axial length adjustment of said building surface including a circumferential set of axially opposed pairs of segments abutting at the mid-circumferential plane of the first said set disposed in slidable interfitting relation with and slidable axially oppositely along said T-section key, each segment of said pairs having a radially inward extending portion, said portions being respectively axially outward of and adjacent the legs of said single set of segments, an axially opposed pair of hub members movable coaxially outward relatively of said single set of segments, each said hub member having radially extending guide means slidably retaining the respectively associated portions of said opposed pairs of segments.

3. A tire building drum as claimed in claim 2, further comprising means locking said legs and said portions positively when said cylindrical surface is at the diametrally larger of said conditions.

4. A tire building drum as claimed in claim 3, further comprising means fixed axially between the legs of said single set of segments and slidably engaging the same to prevent movement thereof axially of the drum.

5. A tire building drum as claimed in claim 2, 3 or 4 including a plurality of cover plates secured respectively to circumferentially adjacent single segments of said opposed pairs thereof and overlying the full axial length of the axially abutted pairs of said opposed pairs of segments and each overlying arcuate portions of circumferentially adjacent pairs of said opposed pairs of segments.

6. A tire building drum as claimed in claim 5, further including a pair of turnup bladders mounted respectively on said hub members, said bladders when deflated having diameters equal to the diameter of said surface in the lesser of said diametral conditions.

7. A tire building drum having an axially and circumferentially extendable elastomeric center sleeve providing a cylindrical building surface, and a pair of cord-reinforced turnup bladders disposed coaxially to extend axially outward respectively from the axial ends of said surface, and comprising:

a center shaft;

a pair of hub members mounted slidably on the shaft, each member having a plurality of axially extending bores therethrough parallel to the shaft and radially spaced therefrom, an annular inflatable tube disposed circumferentially about said body and expandable radially outwardly thereof in response to influx of pressurized air therein;

an annular hollow body fixed axially and corotatably on the shaft between said hub members, a gear housing disposed coaxially in the hollow body, a ring gear accommodated for rotation coaxially of the shaft in said housing, a plurality of right and lefthand lead screws accommodated in said bores, a pinion fixed coaxially on each screw in driving mesh with said ring gear;

associated with each said screw a first nut fixed in one of said hub members in threaded engagement with said screw, a second nut fixed in the other of said hub members and provided with means for locating the same angularly with respect to said screw before being fixed in said other hub member;

a plurality of central segments arranged in circumferential sequence about said body and movable radially of the shaft in response to change of pressure in said annular tube, each segment of said plurality thereof having a T-section key fixed thereon to extend axially from one to the other end of the segment parallel to said shaft;

said central segments each having a radially inwardly extending leg disposed slidably along the respectively associated face of said body and having a stop face;

an annular guide plate fixed to each of said hub members, each plate having coplanar radial guide keys spaced at equal angles about the shaft;

a plurality of axially opposed pairs of segments arranged in two circumferential rows about said central segments, the segments of said pairs each having an axial portion extending to abut the associated segment of such pair at the mid-circumferential plane of the central segments and a radially inwardly extending portion, a T-slot extending axially in said axially extending portion, a U-slot extending radially in said radially extending portion, said T-slot being slidably engaged with the respectively associated T-section key for axial movement in response to rotation of said screws, said U-slot being slidably engaged with the respectively associated guide slot key for radial movement with the respectively associated central segment, and groove means on each of said paired segments securing a respectively associated edge of said center sleeve;

said center body having an equal and opposite pair of annular cylindrical cavities opening axially outwardly toward the respectively associated hub member and an annular piston in each of said cavities movable axially thereof toward the respectively associated hub member in response to influx of pressured air in said cavity, each piston having a lip engageable with the respectively associated positive stop face at the outward excursion of the associated central segment;

an annular chamber in each of said hub members open outwardly of the respective member axially toward the other of said hub members, and an annular piston in each said chamber movable axially outwardly of the respective chamber in response to influx of pressured air therein, each piston having an axially extending lip, said lip being engageable with the respectively associated radially extending portion of the respectively associated segment of said pairs at the radially outward excursion thereof;

each said radial leg having a recess open axially outwardly therefrom and accommodating collectively a pair of elastic rings biasing said central segments radially inwardly, and a stop ledge;

a pair of stop rings fixed respectively coaxially on the faces of said body for engagement with the associated stop ledge to determine the outward excursion of said central segments;

means removably fixed respectively on each of said hub members and carrying said turnup bladders;

and a plurality of cover plates each secured to one segment of each of said paired segments, each plate extending axially from end to end of said paired segments while the same are abutted and arcuately overlying a portion of the next circumferentially adjacent pair of said paired segments.

* * * * *